United States Patent [19]

Ghidoni et al.

[11] Patent Number: 5,296,539
[45] Date of Patent: Mar. 22, 1994

[54] THERMOPLASTIC COMPOSITIONS WITH IMPROVED MECHANICAL CHARACTERISTICS

[75] Inventors: Dario Ghidoni, Gonzaga; Gian C. Fasulo, San Silvestro; Italo Borghi, Ferrara, all of Italy

[73] Assignee: ECP Enichem Polimeri S.R.L., Milan, Italy

[21] Appl. No.: 108,255

[22] Filed: Aug. 19, 1993

Related U.S. Application Data

[63] Continuation of Ser. No. 856,683, Mar. 24, 1992, abandoned.

[30] Foreign Application Priority Data

Mar. 29, 1991 [IT] Italy .................. MI 91 A 000890

[51] Int. Cl.$^5$ ................ C08L 51/04; C08L 77/06
[52] U.S. Cl. ........................... 525/66; 525/179
[58] Field of Search .................. 525/66, 179, 184

[56] References Cited

U.S. PATENT DOCUMENTS

| | | | |
|---|---|---|---|
| 3,093,255 | 6/1963 | Mesrobian | 525/184 |
| 3,458,596 | 7/1969 | Faigle | 525/184 |
| 4,078,014 | 5/1978 | Starkweather | 525/179 |
| 4,321,336 | 3/1982 | Meyer | 525/183 |
| 4,584,344 | 4/1986 | Baer | 525/66 |
| 4,981,906 | 1/1991 | Tomono | 525/66 |

FOREIGN PATENT DOCUMENTS

| | | |
|---|---|---|
| 012482 | 8/1986 | Japan . |
| 199397 | 3/1987 | Japan . |
| 014025 | 8/1990 | Japan . |
| 162919 | 2/1991 | Japan . |
| 1284489 | 8/1972 | United Kingdom . |

Primary Examiner—Ana L. Carrillo
Assistant Examiner—I. Zemel
Attorney, Agent, or Firm—Oblon, Spivak, McClelland, Maier & Neustadt

[57] ABSTRACT

Thermoplastic compositions with improved mechanical characteristics, including:
a) a graft impact-resistant vinylaromatic copolymer containing a quantity of between 0.1 and 2% by weight of an ethylenically unsaturated compound having a carboxylic group or one of its derivatives in the molecule;
b) a polyamide resin and
c) a polyolefin.

14 Claims, No Drawings

THERMOPLASTIC COMPOSITIONS WITH IMPROVED MECHANICAL CHARACTERISTICS

This application is a continuation of application Ser. No. 07/856,683, filed on Mar. 24, 1982, now abandoned.

The present invention relates to thermoplastic compositions with improved mechanical characteristics.

More specifically, the present invention relates to thermoplastic compositions based on a graft impact-resistant, styrene copolymer, a polydmide and a polyolefin having improved mechanical properties, particularly suitable for injection moulding and thermoforming.

BACKGROUND OF THE INVENTION

It is well-known that impact-resistant vinyl aromatic copolymers are obtained by bulk polymerization or bulk-suspension polymerization, of solutions of olefinic rubbers, of the ethylene-propylene (EPM) or unconjugated ethylene-propylene-diene type, in a vinyl aromatic monomer alone or mixed with other copolymerizable ethylenically unsaturated monomers.

Styrene-acrylonitrile copolymers grafted on olefinic rubbers (AES) have excellent impact strength but their low thermoresistance makes them unsuitable for certain applications where temperatures of 120°–160° C. are used or for the preparation of products which come into contact with parts heated up to these temperatures.

To overcome this defect in AES copolymers, it is customary to mix these with other polymers having a good thermoresistance, such as a polyamide. This resin does, in fact, have good elongation, high energy absorption, especially in ball drop tests and excellent thermoresistance; however its great sensitivity to notching and high water absorption considerably limit the use of this resin. In addition, the polyamides are not very compatible with impact-resistant vinyl aromatic copolymers, consequently the interfaces between the domains of the components of the mixture represent extremely weak areas along which breakage of the material occurs.

To make polyamides compatible with the impact-resistant vinylaromatic polymers, Italian Patent Application 20921 A/90, filed on Dec. 17, 1990 by the present Applicant, proposed the use of a graft, impact-resistant, vinylaromatic copolymer containing in its chain units deriving from an ethylenically unsaturated comonomer having a carboxylic group or one of its derivatives.

The above Italian Patent Application relates to a thermoplastic composition including:

A) from 10 to 90% by weight of a graft, impact-resistant, vinylaromatic copolymer composed of a copolymer of a vinylaromatic monomer and of an acrylic ethylenically unsaturated monomer, and an olefinic elastomer, said copolymer formed by vinylaromatic monomer-acrylic ethylenically unsaturated monomer being at least partially grafted on the olefinic elastomer, and containing a grafted quantity of between 0.1 and 2% by weight of an ethylenically unsaturated monomer containing in the molecule a carboxylic group or one of its derivatives, such as anhydride, amide or ester;

B) from 90 to 10% by-weight of a polyamide resin.

The compositions thus obtained, however, still do not have a combination of properties suitable for all the applications for which they are destined; in particular, the ultimate elongation is rather limited. This elongation can be improved by increasing the content of ethylenically unsaturated monomer containing a carboxylic group or one of its derivatives in the vinylaromatic copolymer; but this increase, however, prejudices other characteristics, such as the tensile modulus, especially for high contents of monomer containing a carboxylic group or one of its derivatives.

SUMMARY OF THE INVENTION

The Applicant has now found that the addition of a suitable quantity of a polyolefin to the above thermoplastic compositions, including a graft impact-resistant, vinylaromatic copolymer (A) and a polyamide resin (B), gives these compositions an excellent combination of properties, making them applicable in all fields where extremely high values of ultimate elongation and resilience combined with good modulus and processability values, are required.

The present invention consequently relates to a thermoplastic composition having an excellent balance of mechanical, thermal and rheological properties, including:

A) from 10 to 90% by weight of a graft impact-resistant, vinyl aromatic copolymer composed of a copolymer of a vinylaromatic monomer and an acrylic ethylenically unsaturated monomer, and an olefinic elastomer, said copolymer based on vinylaromatic monomer-acrylic ethylenically unsaturated monomer being at least partially grafted on the olefinic elastomer, and containing a grafted quantity of between 0.1 and 2% by weight of an ethylenically unsaturated monomer containing in the molecule a carboxylic group or one of its derivatives such as anhydride, amide or ester;

B) from 90 to 10% by weight of a polyamide resin; and

C) from 1 to 10 parts by weight, with respect to the mixture of graft impact-resistant, vinylaromatic copolymer (A) and polyamide resin (B), of a polyolefin.

The ratio by weight of graft impact-resistant, vinylaromatic copolymer/polyamide resin (A/B) preferably ranges from 70:30 to 30:70; and the quantity of polyolefin (C) is preferably between 1.5 and 5 parts by weight, with respect to the mixture A+B.

Component A of the thermoplastic composition of the present invention is a graft impact-resistant vinylaromatic copolymer preferably including:

100 parts by weight of an impact-resistant vinylaromatic copolymer composed of 90 to 30% by weight of a copolymer made up of a vinylaromatic monomer-acrylic ethylenically unsaturated monomer, at least partially grafted on 10–70% by weight of an olefinic elastomer, and from 0.1 to 2 parts by weight of an ethylenically unsaturated monomer containing in the molecule a carboxylic group or one of its derivatives such as anhydride, amide or ester; said monomer being grafted to said impact-resistant, vinylaromatic copolymer.

In the copolymer vinyl-aromatic monomer-acrylic ethylenically unsaturated monomer, the ratio by weight of the two monomers ranges from 90:10 to 50:50, preferably from 80:20 to 60:40.

The graft impact-resistant vinylaromatic copolymer (A) used in the compositions of the present invention can be prepared either by means of the direct polymerization of the constituent monomers or by grafting the ethylenically unsaturated monomer, containing a carboxylic group or one of its derivatives, on the preformed impact-resistant copolymer composed of a vinylaromatic monomer, an acrylic ethylenically unsaturated monomer and an olefinic elastomer, in an extruder in the presence of a peroxidic catalyst and at a temperature at least equivalent to that of the melting point of the components.

The polymerization is preferably carried out in continuous manner, using a solution of a mixture of monomers including a vinylaromatic compound, an acrylic ethylenically unsaturated monomer and an ethylenically unsaturated monomer containing a carboxylic group or one of its derivatives in the molecule, in the presence of an olefinic elastomer, a polymerization initiator and an inert solvent.

The polymerization is preferably carried out in one or two reaction steps, in series, and in each step the reaction mass is gently and homogeneously stirred to guarantee a perfect thermal exchange.

The olefinic elastomer and initiator are homogeneously dissolved in the monomers and in the solvent and the solution is fed to the first step, at a constant temperature of between 100° C. and 250° C.; the polymerization is subsequently continued in the following steps at a temperature of between 70° C. and 150° C. and at a higher pressure than that at which the monomers and solvent being fed are evaporated. At the end of the polymerization, the reaction mass is made to flow through a fine film evaporator, heated to a temperature of between 150 and 300° C. and equipped with rotating blades which give the polymer a cutting force which is sufficient to provide the required morphological structure. The unreacted monomers and the solvent, recovered by the evaporator, are fed to the first step.

This process allows the polymerization of the monomers to be carried out underconditions of gentle stirring but at the same time with an excellent thermal control of the reaction without taking into consideration the size or structure of the particles, which are regulated in the finishing step in the fine film evaporator where the unreacted monomers and the solvent are eliminated and, at the same time, the dimensions of the particles are reduced to values lower than 1, and preferably to between 0.1–0.4 microns, by means of a dynamic action which induces a change in the structure of the elastomeric phase.

The solvent used is preferably an aromatic hydrocarbon, such as benzene, toluene, ethyl-benzene, xylene, isopropyl-benzene etc. The quantity of solvent is between 50 and 300, preferably from 60 to 150, parts by weight for every 100 parts by weight of elastomer +monomers.

The polymerization reaction, like almost all solution graft polymerization reactions, is carried out in the presence of a radical polymerization initiator. Any well-known radical initiator can be used even if organic peroxides generally used in graft-polymerization are preferred. Suitable organic peroxides are: aromatic diacyl-peroxides, such as benzoyl-peroxide; peroxy-esters, such as t.butyl-peroxy-isobutyrate, t.butyl-peroxylaurate, t.butyl-peroxybenzoate, etc; perketals such as 1,1-di-t.butyl-peroxy- 3,3,5-trimethyl-cyclohexane, 2,2-di-t.butyl-peroxy-butane etc.; peroxy carbonates such as t.butyl-peroxy-isopropyl-carbonate; and peroxide-ketones such as 1,1-bis-t.butyl-peroxy-3,3,5-trimethyl-cyclohexanone, etc. It is also possible to use mixtures of two or more of the above-mentioned peroxides. The quantity of peroxide used is such that the polymerization conversion is within a range of 40 and 80% by weight in the first polymerization reactor; generally quantities of between 0.1 and 2.0% by weight, with respect to the total sum of monomers and elastomer, are used.

The fine film evaporator used in the process of the present invention for the finishing and formation of the required morphology of the particles, can be any of the known types. In particular, the fine film evaporator described in European Patent Application publication 267025 is preferred.

The continuous polymerization process in solution specified above is known and described in European Patent Application publication 286071, of which the contents form an integral part of the present Patent Applicant.

The graft impact-resistant vinylaromatic copolymer (A) used in the compositions of the present invention can also be prepared in an extruder or other heat mixing apparatus, by means of direct reaction of the preformed impact-resistant copolymer, composed of a vinylaromatic monomer, acrylic ethylenically unsaturated monomer and olefinic elastomer, with the ethylenically unsaturated monomer containing a carboxylic group or one of its derivatives, in the presence of a peroxide initiator having a half time, at 200° C., of between 2 and 20 sec.

It is preferable to carry out the reaction at temperatures higher than 150° C. and preferably between 170° C. and 250° C. for a duration of more than 15 sec.

Examples of suitable peroxide initiators are: ter.butyl-cumene-peroxide, bis(ter.butyl-peroxy-isopropyl)benzene, di-ter.butyl-peroxide, 2,5-dimethyl-2,5-di-ter.butyl-peroxy hexane, dicumene peroxide etc. All these peroxides are known in commerce under the tradenames of Trigonox ® and Perkadox ® of AKZO Chemie bv.

Concentrations of peroxide initiator of between 0.01 and 1 and preferably of between 0.1 and 0.5 parts by weight for every 100 parts by weight of impact-resistant copolymer, are generally used.

The vinylaromatic monomer, used for the production of the graft impact-resistant copolymer (A), corresponds to the general formula:

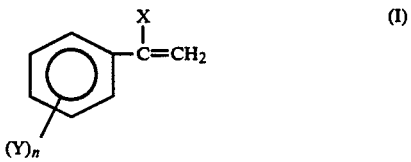

where:
X represents hydrogen or an alkyl radical having from 1 to 4 carbon atoms;
Y represents hydrogen, a halogen or an alkyl radical having from 1 to 4 carbon atoms; and n is 0 or an integer between 1 and 5.

Examples of vinylaromatic monomers having the above general formula are: styrene; methyl-styrene; mono-, di-, tri-tetra- and penta-chloro-styrene and the corresponding alpha-methyl-styrenes; styrenes alkylated in the nucleus and the corresponding alpha-methyl-styrenes such as ortho- and para-methyl-styrenes; ortho- and para-methyl-alpha-methyl-styrenes; 3,5-dimethyl-styrene and t.butyl-styrene, etc.

These monomers can be used alone or mixed with each other.

Styrene is the preferred vinylaromatic monomer.

The acrylic ethylenically unsaturated monomer has the general formula:

$$CH_2=C-CN \atop | \atop R \qquad (II)$$

wherein R is hydrogen or an alkyl group containing from 1 to 5 carbon atoms. Acrylonitrile is the preferred monomer.

Olefinic elastomers suitable for being used in the copolymers of the present invention include those at both high and low unsaturation. Among the low unsaturation elastomers mainly EPM and EPDM rubbers are to be mentioned, preferably having a ratio by weight ethylene/propylene of between 90:10 and 20:80. The content of unconjugated diene is preferably between 4 and 50, in terms of the iodine number. The unconjugated diene may be a norbornene; a cyclic diene, such as dicyclopentadiene, cyclo-octadiene-1,5; or an aliphatic diene such as pentadiene 1,4; hexadiene-1,4; hexadiene-1,5, etc.

Preferred EPDM rubbers are terpolymers ethylene/propylene/5-methyl-tetrahydroindene, ethylene/propylene/6-ethylidene-2-norbornene, ethylene/propylene/6-methylene-2-norbornene, ethylene/propylene/5-ethylidene-2-norbornene etc.

The highly unsaturated elastomer may be polybutadiene, polyisoprene, the copolymers of butadiene and/or of isoprene with styrene or other monomers, polychloroprene, etc.

The quantity of elastomer used is such that the content of rubber in the final copolymer is within a range of 10 to 70% by weight, preferably between 15 and 40%.

Any ethylenically unsaturated monomer containing a carboxylic group or one of its derivatives in the molecule, may be used for the production of the graft impact-resistant vinylaromatic copolymers (A). Specific examples of these monomers are: maleic acid, fumaric acid, maleic anhydride, maleic amide, unsaturated carboxylic acids such as acrylic acid, crotonic acid, vinylacetic acid, pentenoic acid, 2 or 3 pentenoic acid, alpha-ethyl-acrylic acid, beta-methylcrotonic acid, 2-methyl-2-pentanoic acid, alpha-ethylcrotonic acid, 2,2-dimethyl-3-butenoic acid, heptenoic acid, 2-octenoic acid, 9-tetradecinoic acid, 9-hexadeconoic acid, 2-octadecenoic acid, 9-octadecenoic acid, decosenoic acid, erucic acid, 2,4-pentadienoic acid, diallyl-acetic acid, linoleic acid, linolenic acid, etc. and esters, amides and anhydrides of these unsaturated acids.

The preferred ethylenically unsaturated monomers are maleic anhydride, maleimides and fumaric acid; particularly the first one, due to its high reactivity.

It is evident that in graft polymerization not all of the unsaturated monomers are grafted on the rubber substrate; some of them may form free copolymers which are present in a physical mixture with the graft copolymer.

The quantity of monomers grafted on the rubber substrate can be determined by extracting the copolymer with a solvent of the non-grafted resin.

Polyamide resins (component B) suitable for the purpose of the present invention are the conventional ones, which can be injection moulded, generally known as nylon resins including aliphatic polylactams obtained by the ring opening of lactams and polyamides produced by polycondensation with an aliphatic diamine, containing from 4 to 14 carbon atoms, with an aliphatic bicarboxylic acid containing from 4 to 12 carbon atoms. Examples of suitable polyamide resins are: nylon 4; nylon 6; nylon 7; nylon 11; nylon 12; nylon 6,6; nylon 6,9; nylon 6,10; nylon 6,1,2 etc. Partially aromatic nylons may also be used as component B in the compositions of the present invention. The term "partially aromatic nylon" refers to those obtained by either partially or completely substituting an aliphatic residue of an aliphatic nylon with an aromatic residue.

For example, the residues of adipic acid of nylon 6,6 can be substituted with residues of terephthalic acid or isophthalic acid or mixtures of these; similarly, some aminic residues can have an aromatic character.

Preferred polyamidic resins are nylon 6, nylon 6,6 or the random copolymers nylon 6 and nylon 6,6.

The average molecular weight of the polyamide resins is preferably higher than 10,000 and more preferably higher than 15,000 and up to 40,000 and the melting point is preferably higher than 200° C.

The polyolefin, used as component (C) in the compositions of the present invention, can be polyethylene, polypropylene or a copolymer ethylene-propylene having a prevalent content of ethylene, such as a copolymer composed of from 75 to 98% by weight of ethylene and from 25 to 2% of propylene; polybutene and polypentene may also be used.

The term "polyethylene" includes any polymer of ethylene having a density of between 0.90 and 0.97 g./cm$^3$ among which are those known as low density polyethylene (LDPE), linear low density polyethylene (LLDPE), and high density polyethylene (HDPE). These polymers are known in commerce under the tradenames of ESCORENE® LL 1201 (LLDPE) of the company EXXON; RIBLENE® AK 1912 (LDPE) of the company ENICHEM; ERACLENE HU® 5013 (HDPE) of the company ENICHEM, etc.

Linear low density polyethylene (LLDPE) is particularly preferred in the compositions of the present invention, in that for concentrations of between 2 and 3 parts by weight, for every 100 parts by weight of the sum of components A+B, it gives the best results with respect to mechanical, physical properties, processability of the composition, in terms of resilience (IZOD), ultimate elongation, flow modulus and melt flow index (=MFI).

The compositions of the present invention can be prepared by mixing under heat in any known mixing unit having a medium or high mixing power, such as mono- and twin-screw extruders, Banbury mixer, mixing rolls etc, at a temperature of between 220 and 260° C.

The compositions of the present invention can contain stabilizers, UV stabilizers or other thoroughly incorporated additives, such as plasticizers, lubricants, flame-resistant agents, flow agents, antistatic agents, dyes, pigments, glass fibres or other inorganic charges etc. to give the material special characteristics.

The compositions of the present invention are easily processable and have a mixture of properties which make them suitable for use in the preparation of articles having a high impact strength together with a high thermal resistance and reduced sensitivity to water.

These compositions can be used in the fields of motor-transport, for the production of pieces which can be oven-painted, for parts which come into contact with the engine, electrical appliances, electronic equipment and general technical articles in the form of cups, boxes, containers, panels, sheets, rods, etc.

The compositions can be used for producing expanded items, using the techniques which are known in the art.

DESCRIPTION OF THE PREFERRED EMBODIMENTS

The following examples provide an illustration of the present invention, for its comprehension and use, but do not limit it in any way.

In the examples, all the parts and percentages are given by weight if not otherwise specified.

EXAMPLES 1-4

Using a twin-screw Baker-Perkins MPC V30 extruder, compositions were extruded, with degassing and at a temperature of 240° C.-250° C., composed of:
A) a graft impact-resistant styrene copolymer composed of 30% by weight of EPDM rubber having a Mooney viscosity of 62-72 ML-4 at 100° C. and an iodine number of 18, and 70% by weight of a styrene/acrylonitrile (SAN) copolymer in a weight ratio of 70/30, containing 0.2% by weight, with respect to the impact-resistant copolymer, of graft maleic anhydride. This copolymer was obtained in accordance with the process described in Italian Patent Application 20306 A/90 filed on May 5, 1990 by the present Applicant;
B) Nylon 6 produced by Montedipe under the tradename of "TERNIL B 27", having an average molecular weight of 18,000.
C) linear low density polyethylene, produced by EXXON under the trade-name of ESCORENE ® LL 1201.

The weight ratios between the constituents of the mixture are shown in Table 1.

Granules were obtained by cutting the spaghetti leaving the extruder, and were dried for 2-4 hours at 80°-90° C.

To evaluate the thermal and mechanical properties, the granules were injection moulded at a temperature of 220°-240° C. on a Negri & Bossi V17 press to obtain test samples having the dimensions required by ASTM regulations.

The characteristics measured and the methods used are the following:

MECHANICAL PROPERTIES

The ultimate elongation was determined in tensile tests together with the ultimate tensile strength, the yield point and tensile modulus, in accordance with ASTM D638 regulations, and the IZOD resilience in accordance with ASTM D256 regulation, on test samples having a thickness of 12.7 mm.

THERMAL PROPERTIES

The VICAT A softening point (1 Kg in oil) was determined in accordance with regulation ISO 306.

RHEOLOGICAL PROPERTIES

The Melt Flow Index (M.F.I.) was determined in accordance with regulation ASTM D 1238, at 260° C. and 5 kg. The properties measured are shown in the following table.

TABLE

| | | EXAMPLES | | | |
|---|---|---|---|---|---|
| | | 1* | 2 | 3 | 4 |
| COMPOSITIONS | | | | | |
| A) Graft impact-resistant styrene copolymer | | 50 | 50 | 50 | 50 |
| B) TERNIL B 27 | | 50 | 48.5 | 47.5 | 46 |
| C) ESCORENE LL 1201 | | — | 1.5 | 2.5 | 4 |
| PROPERTY | UNIT | | | | |
| IZOD at 12.7 mm | J/m | 100 | 320 | 780 | 330 |
| Tensile modulus | N/mm$^2$ | 1650 | 1800 | 1650 | 1700 |
| Ultimate tensile strength | N/mm$^2$ | 40 | 43 | 40 | 44 |
| Yield point | N/mm$^2$ | 37 | 39 | 36 | 37 |
| Elongation | % | 120 | 180 | 280 | 220 |
| VICAT A | °C. | 192 | 193 | 191 | 188 |
| M.F.I. 260° C./5 kg | g/10' | 6 | 10.4 | 10.7 | 11 |

*Comparison example

EXAMPLE 5

Example 3 was repeated substituting ESCORENE ® LL 1201 with ERACLENE HUG 5013, a high density polyethylene produced and sold by ENICHEM S.p.a.

The properties of the mixture thus obtained were:
IZOD at 12.7 mm: 254 J/m
Tensile Modulus: 1700 N/mm$^2$
Ultimate tensile strength: 43 N/mm$^2$
Yield point: 37 N/mm$^2$
Elongation: 211%
VICAT A: 188° C.
M.F.I. (260° C./5 Kg): 10.5 g/10'

We claim:
1. Thermoplastic compositions having improved mechanical characteristics comprising:
A) from 10 to 90% by weight of a graft impact-resistant vinylaromatic copolymer containing between 0.1 and 2% by weight of an ethylenically unsaturated compound containing in its molecule a carboxylic acid, anhydride, amide or ester group, said vinylaromatic copolymer being at least partially grafted on an olefinic elastomer;
B) from 90 to 10% by weight of a polyamide resin; and
C) from 1 to 10 parts by weight, with respect to the mixture composed of the graft impact-resistant vinylaromatic copolymer (A) and the polyamide resin (B), of a polyolefin.

2. Thermoplastic compositions in accordance with claim 1, wherein the weight ratio graft impact-resistant vinylaromatic copolymer/polyamidic resin (A/B) ranges from 70:30 to 30:70 and the quantity of the polyolefin (C) is between 1 and 5 parts by weight with respect to the mixture A+B.

3. Thermoplastic compositions in accordance with claims 1 or 2, wherein the graft impact-resistant vinylaromatic copolymer (A) is composed of a copolymer of a vinylaromatic monomer and an acrylic ethylenically unsaturated monomer and of an olefinic elastomer, said vinylaromatic monomer-acrylic ethylenically unsaturated monomer copolymer being at least partially grafted on the olefinic elastomer, and containing a grafted quantity of between 0.1 and 2% by weight of an ethylenically unsaturated monomer containing in the molecule a carboxylic acid, anhydride, amide or ester group.

4. Thermoplastic compositions in accordance with claims 1 or 2, wherein the graft impact-resistant vinylaromatic copolymer includes: 100 parts by weight of an impact-resistant vinylaromatic copolymer composed of from 90 to 30% by weight of a copolymer made of vinylaromatic monomer-acrylic ethylenically unsaturated monomer at least partially grafted on 10-70% by weight of an olefinic elastomer, and from 0.1 to 2 parts by weight of an ethylenically unsaturated monomer containing in the molecule a carboxylic acid, anhydride,amide or ester group; said ethylenically unsaturated monomer being grafted to said impact-resistant vinylaromatic copolymer.

5. Thermoplastic compositions in accordance with claim 4, wherein the weight ratio between the vinylaromatic monomer and the acrylic ethylenically unsaturated monomer in the graft impact-resistant vinylaromatic copolymer is between 90:10 and 50:50.

6. Thermoplastic compositions in accordance with claims 1 or 2, wherein the vinylaromatic monomer is styrene.

7. Thermoplastic compositions in accordance with claim 3, wherein the acrylic ethylenically unsaturated monomer is acrylonitrile.

8. Thermoplastic compositions in accordance with claims 1 or 2, wherein the graft impact-resistant vinylaromatic copolymer (A) contains an olefinic elastomer EPM or EPDM, wherein the weight ratio ethylene/propylene is between 90:10 and 20:80 and the content of unconjugated diene is between 4 and 50 in terms of the iodine number.

9. Thermoplastic compositions in accordance with claims 1 or 2, wherein the ethyleneically unsaturated monomer containing a carboxylic acid, anhydride, amide or ester group is maleic anhydride.

10. Thermoplastic compositions in accordance with claims 1 or 2, wherein the polyamide resin (B) is nylon 6 having an average molecular weight higher than 10,000 and up to 40,000.

11. Thermoplastic compositions in accordance with claims 1 or 2, wherein the polyolefin (C) is selected from polyethylene having a density of between 0.90 and 0.97 g/cm$^3$, polypropylene or an ethylene-propylene copolymer having an ethylene content of between 75 and 98% by weight.

12. Thermoplastic compositions in accordance with claim 11, wherein the polyolefin is linear low density polyethylene.

13. Thermoplastic compositions in accordance with claim 12, wherein the concentration of linear, low density polyethylene is between 2 and 3 parts by weight, with respect to components A+B.

14. Thermoplastic compositions in accordance with claims 1 or 2, containing in addition, stabilizers, plasticizers, lubricants, flame-resistant agents, flow agents, antistatic agents, dyes, pigments, glass fibers and/or other inorganic fillers.

* * * * *